US012695788B2

(12) United States Patent
Anderson et al.

(10) Patent No.: US 12,695,788 B2
(45) Date of Patent: Jul. 28, 2026

(54) MACHINE-LEARNING ASSOCIATION OF APPLICATION-SPECIFIC FLOWS WITHIN ENCRYPTED QUIC TRAFFIC

(71) Applicant: Cisco Technology, Inc., San Jose, CA (US)

(72) Inventors: Blake Harrell Anderson, Chapel Hill, NC (US); David McGrew, Poolesville, MD (US); Keith Richard Schomburg, Apex, NC (US); Michael Scott Dorsey, Sykesville, MD (US); Constantinos Kleopa, Clarksville, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 19/060,062

(22) Filed: Feb. 21, 2025

(65) Prior Publication Data

US 2025/0211618 A1     Jun. 26, 2025

Related U.S. Application Data

(63) Continuation of application No. 19/005,551, filed on Dec. 30, 2024, which is a continuation of application
(Continued)

(51) Int. Cl.
*H04L 65/1066*     (2022.01)
*G06F 21/56*       (2013.01)
(Continued)

(52) U.S. Cl.
CPC ........ *H04L 63/166* (2013.01); *H04L 63/0435* (2013.01); *H04L 63/1425* (2013.01); *H04L 63/20* (2013.01)

(58) Field of Classification Search
None
See application file for complete search history.

(56) References Cited

U.S. PATENT DOCUMENTS 9,813,314 B2    11/2017  Vasseur et al.
10,135,830 B2   11/2018  Bercovich et al.
(Continued)

FOREIGN PATENT DOCUMENTS

CN      109995601 B      12/2020
CN      113518042 A   *  10/2021   ......... H04L 47/2483
(Continued)

OTHER PUBLICATIONS

Classifying flows and buffer state for YouTube's HTTP adaptive streaming service in mobile networks. Tsilimantos. ACM. (Year: 2018).*
(Continued)

*Primary Examiner* — Venkat Perungavoor
(74) *Attorney, Agent, or Firm* — Lee & Hayes, P.C.

(57)     ABSTRACT

In one embodiment, a method herein comprises: obtaining, at a device, one or more packets of an encrypted QUIC traffic session in a network; determining, by the device, a plurality of application-specific flows multiplexed within the encrypted QUIC traffic session; and associating a plurality of packets within the encrypted QUIC traffic session with a first application-specific flow of the plurality of application-specific flows by applying a machine learning classifier to one or more packets from the encrypted QUIC traffic session.

18 Claims, 9 Drawing Sheets

Related U.S. Application Data

No. 17/531,063, filed on Nov. 19, 2021, now Pat. No. 12,184,694, which is a continuation-in-part of application No. 16/512,474, filed on Jul. 16, 2019, now Pat. No. 11,223,653.

(51) Int. Cl.
| | |
|---|---|
| *H04L 9/40* | (2022.01) |
| *G06F 21/55* | (2013.01) |
| *H04L 65/75* | (2022.01) |

(56) References Cited

U.S. PATENT DOCUMENTS

| | | | |
|---|---|---|---|
| 10,148,664 | B2 | 12/2018 | Bercovich et al. |
| 10,171,495 | B1 | 1/2019 | Bowen |
| 10,356,117 | B2 | 7/2019 | Brabec et al. |
| 10,382,401 | B1 | 8/2019 | Lee et al. |
| 10,721,134 | B2 | 7/2020 | Papaloukopoulos et al. |
| 10,805,320 | B1 | 10/2020 | Wang et al. |
| 11,140,068 | B2 | 10/2021 | Sakya et al. |
| 2016/0020969 | A1 | 1/2016 | Vasseur et al. |
| 2018/0054440 | A1 | 2/2018 | Bercovich et al. |
| 2018/0183688 | A1* | 6/2018 | Mihály ............... H04L 41/5051 |
| 2019/0020670 | A1 | 1/2019 | Brabec et al. |
| 2020/0145435 | A1 | 5/2020 | Chiu et al. |
| 2020/0234582 | A1 | 7/2020 | Mintz |
| 2021/0006471 | A1 | 1/2021 | Kvasyuk et al. |
| 2022/0116327 | A1 | 4/2022 | Salkintzis |
| 2023/0073891 | A1* | 3/2023 | Wang .................... H04L 41/082 |
| 2023/0189368 | A1* | 6/2023 | Zhou ................. H04W 28/0865 |
| | | | 370/328 |
| 2023/0328102 | A1 | 10/2023 | Savin et al. |
| 2023/0379397 | A1* | 11/2023 | Su ........................... H04L 69/14 |
| 2023/0379398 | A1* | 11/2023 | Su ........................ H04L 47/6215 |
| 2024/0388604 | A1* | 11/2024 | Zhang ................. H04L 63/0414 |

FOREIGN PATENT DOCUMENTS

| | | |
|---|---|---|
| EP | 3429130 A1 | 1/2019 |
| EP | 3767916 A1 | 1/2021 |
| WO | 2015128609 A1 | 9/2015 |

OTHER PUBLICATIONS

A novel QUIC traffic Classifier based on Convolutional Neural Networks. Tong. IEEE. (Year: 2018).*

Althouse J., et al., "JA3—A Method for Profiling SSL/TLS Clients," GitHub Incorporated, Printed 06, Nov. 2019, 6 Pages, Retrieved from URL: https://github.com/salesforce/ja3.

Amazon Web Services Inc., "AWS IP Address Ranges," AWS General Reference, 2019, 12 Pages, Retrieved from URL: https://docs.aws.amazon.com/general/latest/gr/aws-ip-ranges.html.

Anderson B., et al., "Accurate TLS Fingerprinting using Destination Context andKnowledge Bases," Cryptography and Security, Sep. 3, 2020, pp. 1-14, Retrieved from URL: https://arxiv.org/abs/2009.01939.

Anderson B., et al., "Deciphering Malware's use of TLS (Without Decryption)," arxiv.org, Cornell University Library, 201 Olin Library Cornell University Ithaca, NY 14853, Jul. 6, 2016, 17 pages, XP080712441.

Anderson B., et al., "Identifying Encrypted Malware Traffic with Contextual Flow Data," Artificial Intelligence and Security, ACM, 2 Penn Plaza, Suite 701 New York(NY) 10121-0701 USA, Oct. 28, 2016, pp. 35-46, DOI: 10.1145/2996758.2996768, ISBN 978-1-4503-4573-6, XP058300461.

Anderson B., et al., "Limitless HTTP in an HTTPS World: Inferring the Semantics of the HTTPS Protocol without Decryption," Cryptography and Security, May 29, 2018, pp. 1-15, Retrieved from URL: https://arxiv.org/abs/1805.11544.

Anderson B., et al., "The Generation and Use of TLS Fingerprints," Cisco Systems, Inc., Jan. 2019, 24 Pages, Retrieved from URL: https://resources.sei.cmu.edu/asset_files/Presentation/2019_017_001_539902.pdf.

Anderson B., et al., "TLS Beyond the Browser Combining End Host and Network Data to Understand Application Behavior," published Oct. 21-23, 2019, 14 pages, article downloaded from https://dl.acm.org/.

Anderson B., "Towards Generalizable Network Threat Detection," Data Science for Cyber-Security, Sep. 2017, 41 Pages, Retrieved from URL: https://www.statisticalcyber.com.

Brotherston L., "Stealthier Attacks Smarter Defending with TLS Fingerprinting," GitHub, Inc., Sep. 2015, 79 Pages.

Brotherston L., "TLS-Fingerprinting," Github Inc., Printed Nov. 6, 2019, 1 Page, Retrieved from URL: https://github.com/LeeBrotherston/tls-fingerprinting/.

Cloudflare: "IP Ranges," Feb. 21, 2019, 2 Pages, Retrieved from URL: https://www.cloudflare.com/ips/.

Coull S.E., et al., "On Measuring The Similarity Of Network Hosts: Pitfalls, New Metrics, And Empirical Analyses," In Proceedings of the Network and Distributed System Security Symposium, NDSS 2011, The Internet Society, San Diego, California, USA, Feb. 6-9, 2011, 16 Pages.

Deering S., et al., "Internet Protocol, Version 6 (IPv6) Specification," rfc2460.txt, Internet Protocol, Version 6 (IPV6) Specification, Internet Engineering Task Force, IETF, Standard, Internet Society (ISOC) 4, Rue Des Falaises CH-1205 Geneva, Switzerland, Dec. 31, 1998, 39 pages, XP015008244.

Domingos P., "A Few Useful Things to Know about Machine Learning," ACM, Oct. 2012, vol. 55, No. 10, 9 Pages.

Eastlake D., "Transport Layer Security (TLS) Extensions: Extension Definitions," Internet Engineering Task Force (IETF), RFC6066, Jan. 2011, 25 pages, ISSN:2070-1721.

Extended European Search Report for European Application No. 20184913.0, mailed Sep. 28, 2020, 08 Pages.

Flynn M.J., "Some Computer Organizations and Their Effectiveness," IEEE Transactions on Computers, IEEE, Sep. 1972, vol. C-21, No. 9, pp. 948-960.

Friedman, et al., "Bayesian Network Classifiers", Machine Learning, Kluwer Academic Publishers, Nov. 1997, vol. 29, No. 2-3, pp. 131-163.

Gupta V., "Dissecting TLS Client Hello Message," Jul. 27, 2014, Printed Jun. 4, 2019, pp. 1-5, Retrieved from URL: https://serializethoughts.com/2014/07/27/dissecting-tls-client-hello-message/.

Heinemeyer M., "Beyond the hash: How unsupervised machine learning unlocks the true power of JA3," Jun. 22, 2018, Printed Dec. 3, 2021, 3 Pages, Retrieved from URL: https://www.darktrace.com/en/blog/beyond-the-hash-how-unsupervised-machine-learning-unlocks-the-true-power-of-ja-3/.

Husák M., et al., "HTTPS Traffic Analysis and Client Identification Using Passive SSL/TLS Fingerprinting," EURASIP Journal on Information Security, SpringerOpen Journal, Feb. 2016, 14 Pages.

Information Sciences Institute: "Transmission Control Protocol," Darpa Internet Program, Protocol Specification, dated Sep. 1981, 85 pages, Retrieved from URL: http://www.rfc- base.org/txt/rfc-793.txt.

Jiang L., et al., "A Novel Bayes Model: Hidden Naive Bayes," IEEE Transactions on Knowledge and Data Engineering, Oct. 2009, vol. 21, No. 10, pp. 1361-1371.

Korczynski M., et al., "Markov Chain Fingerprinting to Classify Encrypted Traffic," IEEE Infocom 2014—IEEE Conference on Computer Communications, IEEE, Apr.-May 2014, pp. 781-789.

Kotzias P., et al., "Coming of Age: A Longitudinal Study Of TLS Deployment," IMC '18 Proceedings of the Internet Measurement Conference, Association for Computing Machinery, Oct.-Nov. 2018, pp. 415-428.

Liu C., et al., "MaMPF: Encrypted Traffic Classification Based on Multi-Attribute Markov Probability Fingerprints," IEEE, 2018, 10 Pages.

(56) References Cited

OTHER PUBLICATIONS

Maddison J., "Encrypted Traffic Reaches a New Threshold," Nov. 28, 2018, Printed Jun. 4, 2019, pp. 1-4, Retrieved from URL: https://www.networkcomputing.com/network-security/encrypted-traffic-reaches-new-threshold.

Microsoft: "[Deprecating] Microsoft Azure Datacenter IP Ranges," Printed Nov. 12, 2019, 5 Pages, Retrieved from URL: https://www.microsoft.com/en-us/download/details.aspx?id=41653.

"Office 365 URLs and IP Address Ranges," Printed Nov. 2019, Oct. 27, 2019, 30 Pages, Retrieved from URL: https://docs.microsoft.com/en-us/office365/enterprise/urls-and-ip-address-ranges.

Pan W., et al., "Wenc: HTTPS Encrypted Traffic Classification Using Weighted Ensemble Learning and Markov Chain," IEEE, 2017, pp. 50-57.

Pang S., English Translation of CN111310187, 19 Pages.

Postel J., "Internet Protocol," DARPA Internet Program Protocol Specification, RFC 791, Sep. 1981, Information Sciences Institute, University of Southern California, Marina del Rey, CA, 51 pages.

Postel J., "User Datagram Protocol", IETF Trust, RFC 768, Aug. 28, 1980, 3 Pages.

Razaghpanah A., et al., "Studying TLS Usage in Android Apps," CoNEXT '17 Proceedings of the 13th International Conference on emerging Networking Experiments and Technologies, Association for Computing Machinery, Dec. 12-15, 2017, 13 Pages.

Rescorla E., "The Transport Layer Security (TLS) Protocol Version 1.3", Internet Engineering Task Force (IETF), Request for Comments: 8446, Obsoletes: 5077, 5246, 6961, Standards Track, Aug. 2018, pp. 1-160.

Ruiz-Sanchez M.A., et al., "Survey and Taxonomy of IP Address Lookup Algorithms," IEEE Network, IEEE, March/ Apr. 2001, vol. 15, No. 2, pp. 8-23.

Sklower K., "A Tree-Based Packet Routing Table for Berkeley Unix," In Proceedings USENIX Winter 1991, 15 Pages.

Vohra Q., et al., "BGP Support for Four-Octet Autonomous System (AS) Number Space," IETF Trust, Request for Comments: 6793, Dec. 2012, pp. 1-12.

* cited by examiner

600

605 START

610 OBTAIN TELEMETRY DATA REGARDING ENCRYPTED SESSION

615 RETRIEVE CANDIDATE PROCESSES

620 USE MODEL TO ASSIGN PROBABILITIES TO CANDIDATE PROCESSES

625 IDENTIFY PROCESS AS HAVING INITIATED THE SESSION

630 END

MACHINE-LEARNING ASSOCIATION OF APPLICATION-SPECIFIC FLOWS WITHIN ENCRYPTED QUIC TRAFFIC

RELATED APPLICATION

This application is a continuation of U.S. patent application Ser. No. 19/005,551, filed on Dec. 30, 2024, which is a continuation of U.S. patent application Ser. No. 16/512,474, filed on Jul. 16, 2019, both entitled MULTI-PROTOCOL/ MULTI-SESSION PROCESS IDENTIFICATION, by Anderson et al., which is continuation-in-part of U.S. patent application Ser. No. 16/512,474, filed on Jul. 16, 2019, entitled TLS FINGERPRINTING FOR PROCESS IDEN- TIFICATION, by Anderson et al., the entire contents of which are incorporated herein by reference.

TECHNICAL FIELD

The present disclosure relates generally to computer net- works, and, more particularly, to using Transport Layer Security (TLS) fingerprinting for process identification.

BACKGROUND

Network traffic is becoming increasingly encrypted. Indeed, some studies estimate that more than 70% of all network traffic is now encrypted, with this figure expected to continue to grow.

Identifying the process associated with an encrypted traffic session can be quite useful. In the security domain, for example, process identification can be used to detect mal- ware or vulnerable executables on an endpoint. Likewise, in the networking domain, routers and switches can use this information to prioritize traffic or aid in diagnostics, such as analyzing how processes communicate across different net- work segments.

In some protocols, such as Secure Socket Layer (SSL) and the HyperText Transfer Protocol (HTTP), a clear-text/unen- crypted description of the process is sent with the traffic, affording at least some degree of ground truth as to the sending process. However, the Transport Layer Security (TLS) protocol lacks this clear-text description of the source process. TLS fingerprinting offers one potential way to make inferences from the cryptographic parameters offered in the TLS ClientHello message. Unfortunately, though, experi- mentation has shown that a diverse set of executables/ processes typically map to a single TLS fingerprint. For example, automatic software updates can often lead to multiple versions of a software process sharing the same TLS fingerprint, which can make it very difficult to perform tasks like identifying endpoints that are still executing processes that are vulnerable to security exploits.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
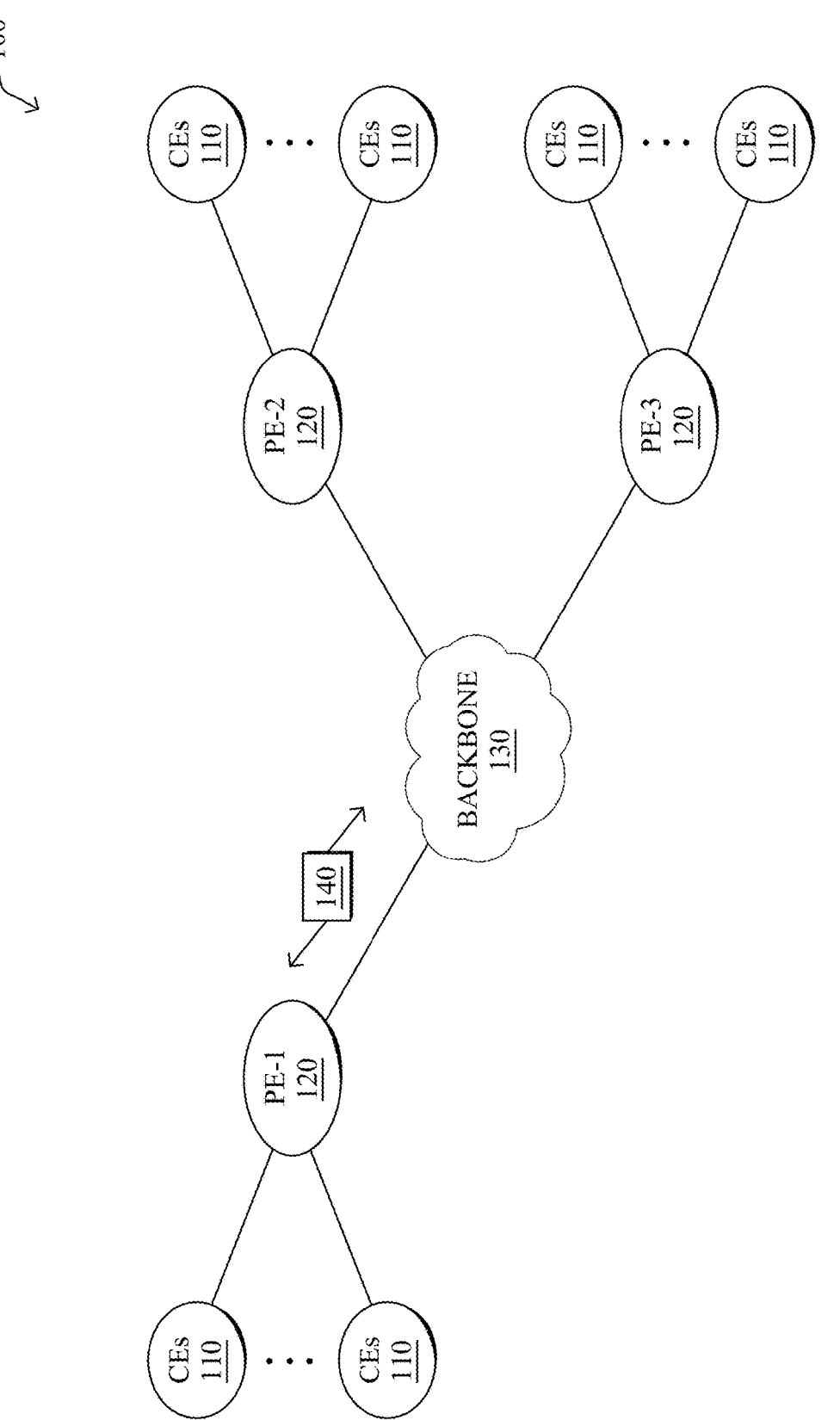
FIGS. 1A-1B illustrate an example communication net- work.

According to one or more embodiments of the disclosure, a device obtains telemetry data regarding an encrypted traffic session in a network. The telemetry data includes Transport Layer Security (TLS) features of the traffic session and auxiliary information indicative of a destination address of the traffic session, a destination port of the traffic session, or a server name associated with the traffic session. The device retrieves, using the obtained telemetry data, a plu- rality of candidate processes from a TLS fingerprint data- base that relates processes with telemetry data from encrypted traffic sessions initiated by those processes. The device uses a probabilistic model to assign probabilities to each of the plurality of candidate processes. The device identifies one of the plurality of candidate processes as having initiated the encrypted traffic session based on its assigned probability.

In further embodiments, a device obtains one or more packets of a traffic session in a network. The device deter- mines, for a particular packet of the one or more packets that match a filter, a fingerprint for the particular packet. The device identifies a plurality of traffic sessions whose packets match the fingerprint, wherein each of the plurality of traffic sessions is associated with at least one process. The device updates a process with the traffic session by applying a classifier to the plurality of traffic sessions.

Description

A computer network is a geographically distributed col- lection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or cam- pus. WANs, on the other hand, typically connect geographi- cally dispersed nodes over long-distance communications links, such as common carrier telephone lines, optical light- paths, synchronous optical networks (SONET), or synchro- nous digital hierarchy (SDH) links, or Powerline Commu- nications (PLC) such as IEEE 61334, IEEE P1901.2, and others. The Internet is an example of a WAN that connects disparate networks throughout the world, providing global communication between nodes on various networks. The nodes typically communicate over the network by exchang- ing discrete frames or packets of data according to pre- defined protocols, such as the Transmission Control Proto- col/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using a CE router with two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
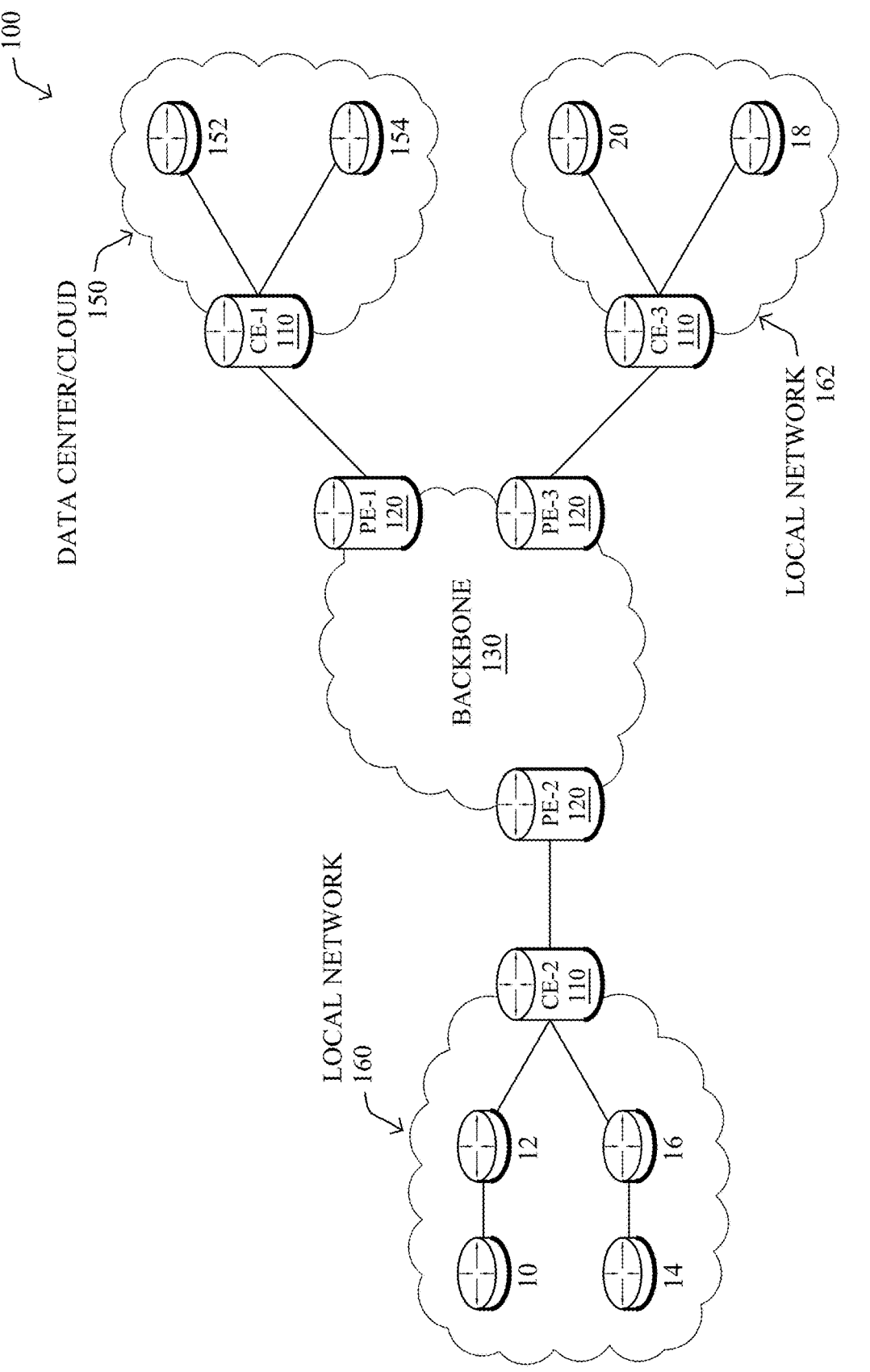

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for devices/nodes 10-16 in the local mesh, in some embodiments.

Figure 2:
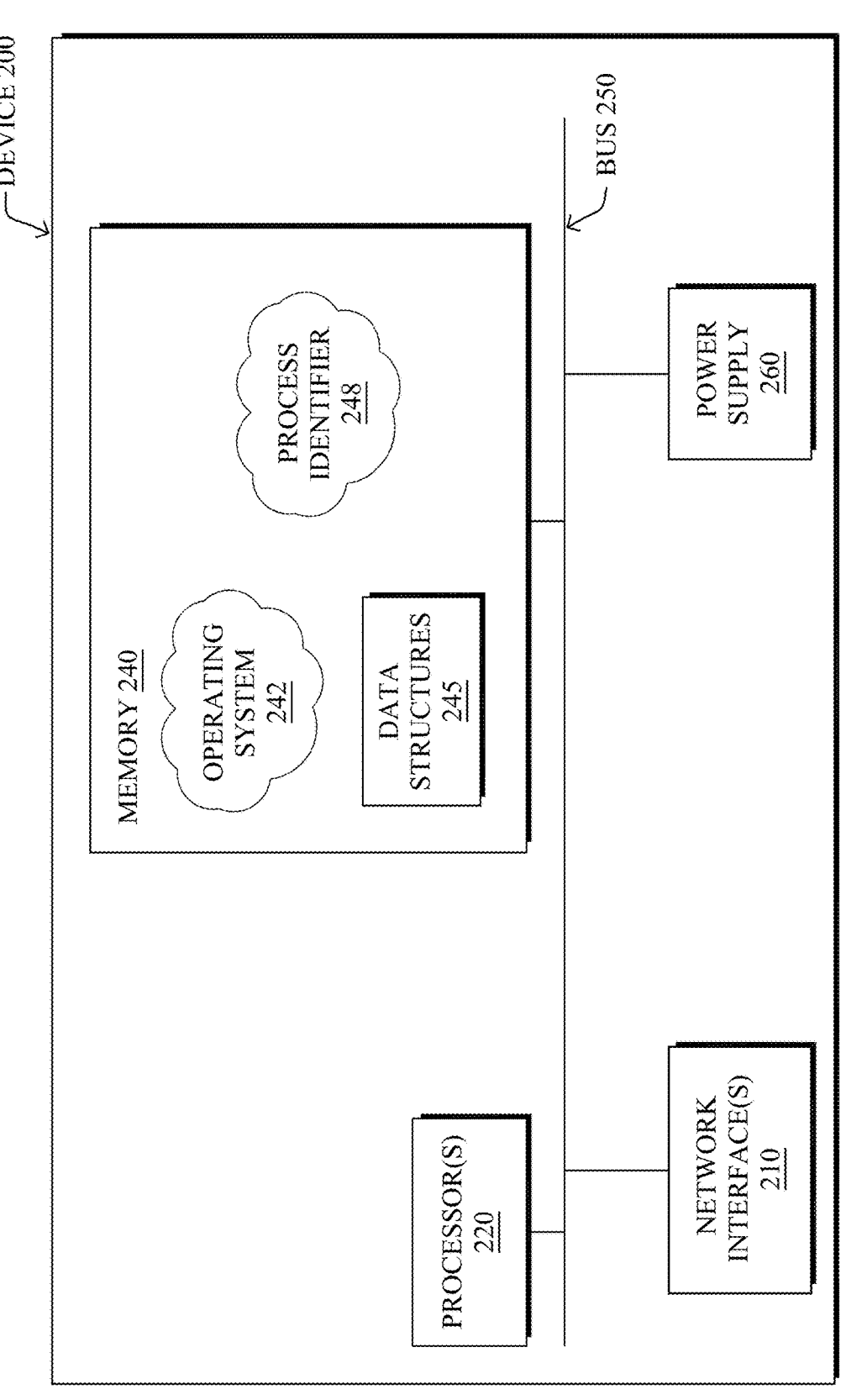
FIG. 2 illustrates an example network device/node.

FIG. 2 is a schematic block diagram of an example node/device 200 (or an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a process identifier 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, process identifier 248 may execute one or more machine learning-based classifiers to identify the source process associated with encrypted traffic in the network for any number of purposes. In one embodiment, process identifier 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, process identifier 248 may identify the process associated with the encrypted traffic for purposes of determining whether the process represents a security vulnerability in the network and should be updated or removed from the endpoint. For example, use of an outdated version of a process could leave the client vulnerable to exploits and identification of the process enables updating of the version automatically or manually.

Process identifier 248 may employ any number of machine learning techniques, to identify the process associated with encrypted traffic based on the observed telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, process identifier 248 can use the model M to classify new data points, such as information regarding new traffic flows and/or processes in the network. Often, M is a statistical model, and the cost function is inversely proportional to the likelihood of M, given the input data.

In various embodiments, process identifier 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that has been labeled with an associated process, if known. On the other end of the spectrum are unsupervised techniques that do not require a training set of labels. Notably, while a supervised learning model may look for previously seen patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that process identifier 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

In some cases, process identifier 248 may assess the captured telemetry data on a per-flow basis. In other embodiments, process identifier 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
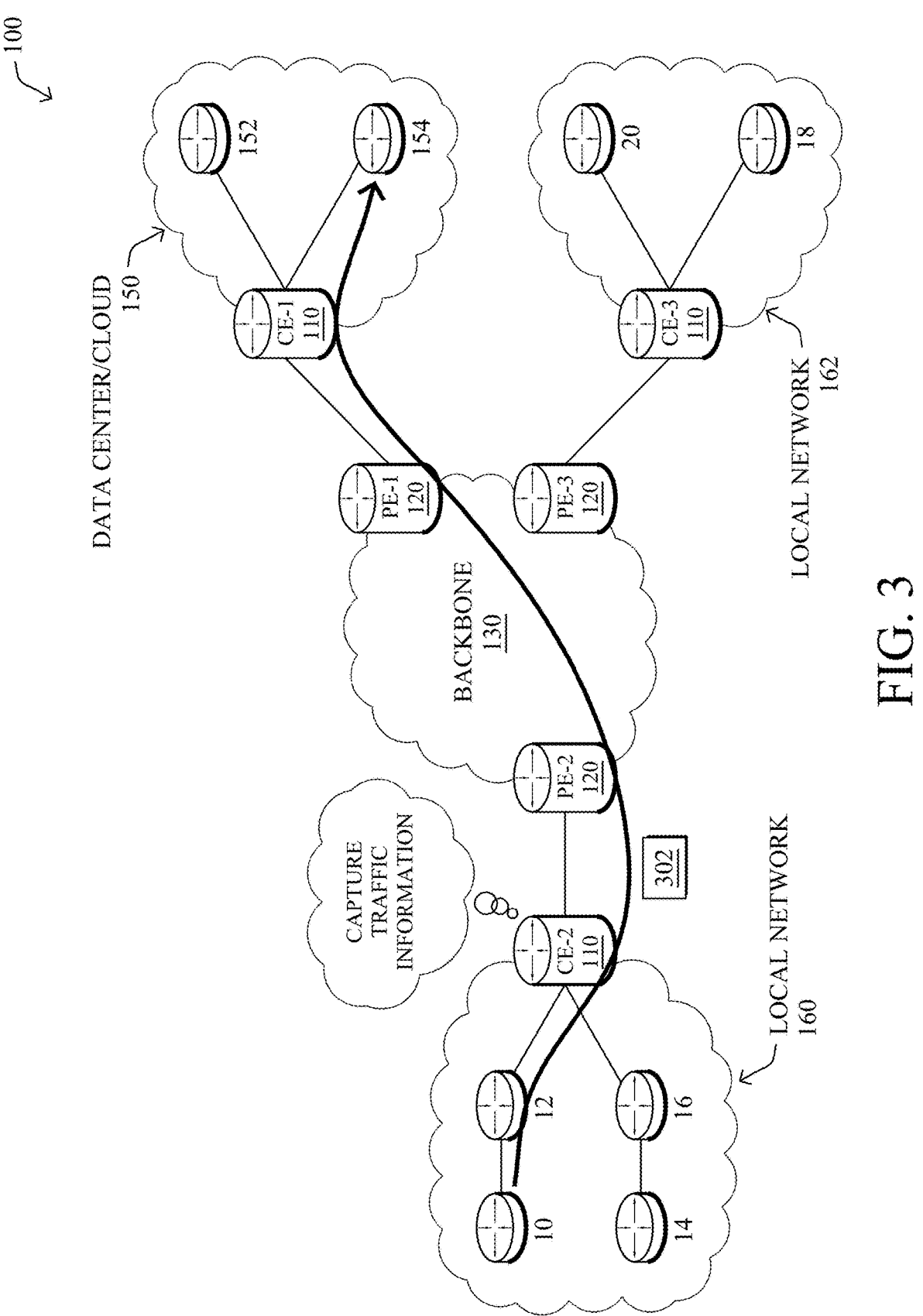
FIG. 3 illustrates an example of a device capturing traffic information.

As shown in FIG. 3, various mechanisms can be leveraged to capture information about traffic in a network, such as telemetry data regarding an encrypted traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, router CE-2 through which the traffic between node 10 and server 154 flows may capture telemetry data regarding the traffic flow.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

Figure 4:
FIG. 4 illustrates an example encrypted session.
Figure 4:
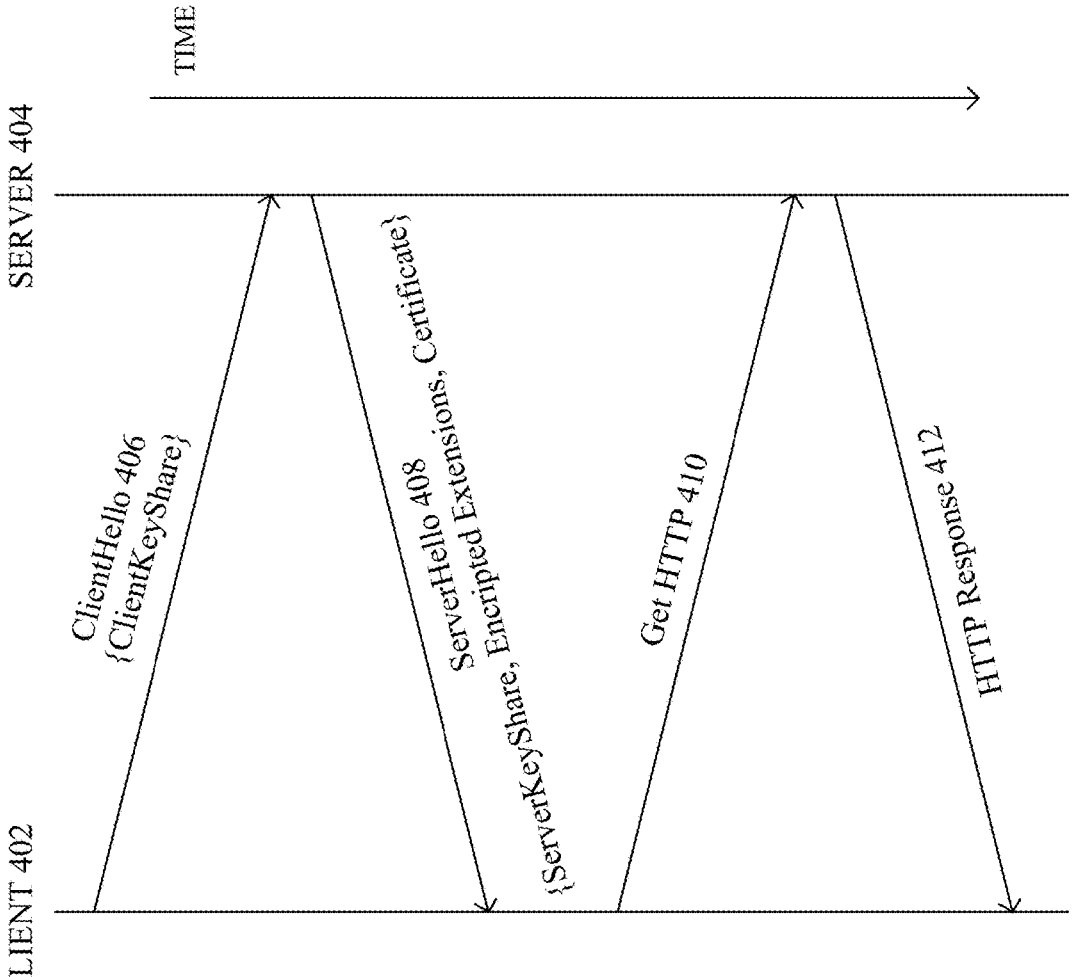

FIG. 4 illustrates an example encrypted session 400 between a client 402 and a server 404. As shown, client 402 may begin by initiating a handshake with server 404 in which cryptographic information is first exchanged. This cryptographic information can then be used by client 402 and server 404, to encrypt subsequent messages between the two. In particular, client 402 may send a ClientHello message 406 to server 404, thereby signifying that client 402 wishes to establish an encrypted session with server 404. Note that, in some cases, client 402 and server 404 may first perform a SYN-ACK, to establish the TCP/IP connection via which ClientHello message 406 may be sent.

In various cases, ClientHello message 406 may include cryptographic keys for client 402 that can be used by server 404 to immediately begin encrypting the messages sent by server 404 back to client 402. This is the approach taken by some encryption mechanisms, such as TLS version 1.3. In prior versions of TLS, and in other schemes, the key exchange is performed only after an exchange of Hello messages.

In response to receiving ClientHello message 406, server 404 may generate and send a ServerHello message 408 back to client 402. Such a ServerHello message 408 may include the server key information for server 404, extensions, and the server certificate of server 404, which may be encrypted using the client keys sent by client 402 as part of ClientHello message 406. Client 402 can then use its own keys to decrypt ClientHello message 406 and begin encrypting its subsequent messages based on the information included in ServerHello message 408. For example, client 402 may use the server certificate included in ServerHello message 408 to authenticate server 404 and the server keys and extensions included in ServerHello message 408 to control the encryption of a GET HTTP message 410 sent by client 402 to server 404. In turn, server 404 can use the information that it obtained from the handshake, to encrypt an HTTP response message 412 sent to client 402 in response to message 410.

One or more intermediary networking devices (e.g., a switch, router, firewall, etc.) located along the path between client 402 and service 404 may capture telemetry data from messages 406-412 of encrypted session 400. For example, ClientHello message 406 may include information such as the version of TLS that client 402 wishes to use, a sessionID, the ciphersuite(s) offered, the compression method, TLS extensions such as Server Name Indication (SNI), Heartbeat, and the like.

As noted above, identifying the underlying process that creates a TLS connection can be useful from both a security standpoint and a networking standpoint. Notably, identification of the underlying process can be used to detect malware, vulnerable executables, and the like. In addition, knowledge of the process can also be used to prioritize traffic, aid in diagnostics (e.g., analyzing how the process communicates across different network segments, etc.), etc.

One approach to identifying the process associated with encrypted traffic is to perform man-in-the-middle traffic inspection. Under this approach, an intermediate proxy between the communicating endpoints essentially acts as each endpoint from the standpoint of the other. More specifically, when one endpoint requests a secure connection with another endpoint, the proxy captures this request and sends its own request on to the other endpoint. In doing so, each endpoint essentially thinks that it is communicating securely with the other endpoint, but is actually communicating instead with the proxy. This allows the proxy to decrypt the traffic and perform packet inspection on the traffic.

A man-in-the-middle proxy approach is not viable in all circumstances. Indeed, there are privacy considerations that may prevent the decryption of all encrypted traffic. Moreover, man-in-the-middle inspection of encrypted traffic becomes very hard with TLS 1.3, as the use of Diffie-Hellmann authenticated handshakes prevents the inspection for legitimate and malicious content alike. While this provides end-to-end confidentiality and integrity protection, it also prevents any effective security inspection of the content.

TLS Fingerprinting for Process Identification

The techniques herein allow for the identification of an executable process associated with an encrypted traffic session without actually decrypting the traffic. In some aspects, the techniques herein can be used to construct an enhanced TLS fingerprint database with process and contextual data captured in any number of networks and updated with fused telemetry data from the network and/or the endpoint. In turn, a model may be constructed on top of the fingerprint database that identifies the most probable process given a new TLS session or set of TLS sessions. Doing so allows a network operator to solve security and networking issues by providing enhanced visibility into the endpoint processes that create the TLS sessions.

Specifically, according to one or more embodiments of the disclosure as described in detail below, a device obtains telemetry data regarding an encrypted traffic session in a network. The telemetry data includes Transport Layer Security (TLS) features of the traffic session and auxiliary information indicative of a destination address of the traffic session, a destination port of the traffic session, or a server name associated with the traffic session. The device retrieves, using the obtained telemetry data, a plurality of candidate processes from a TLS fingerprint database that relates processes with telemetry data from encrypted traffic sessions initiated by those processes. The device uses a probabilistic model to assign probabilities to each of the plurality of candidate processes. The device identifies one of the plurality of candidate processes as having initiated the encrypted traffic session based on its assigned probability.

Illustratively, the techniques described herein may be performed by hardware, software, and/or firmware, such as in accordance with the process identifier 248, which may include computer executable instructions executed by the processor 220 (or independent processor of interfaces 210) to perform functions relating to the techniques described herein.

Operationally, the techniques herein leverage the concept of a TLS fingerprint, to identify the underlying process that initiates an encrypted TLS session in a network. In general, a 'fingerprint' is a sequence of bytes formed by parsing (some of) the fields of a network session, selecting some bytes from some of those fields, and then optionally normalizing them. Similarly, a 'signature' is a rule that is based on the fields of packet headers (including destination port) and patterns that can appear in the data stream of the session, or in a particular field. Likewise, a 'watchlist' refers to a set of IP addresses that identifies compromised or malicious Internet servers, or other important categories of devices.

Figure 5:
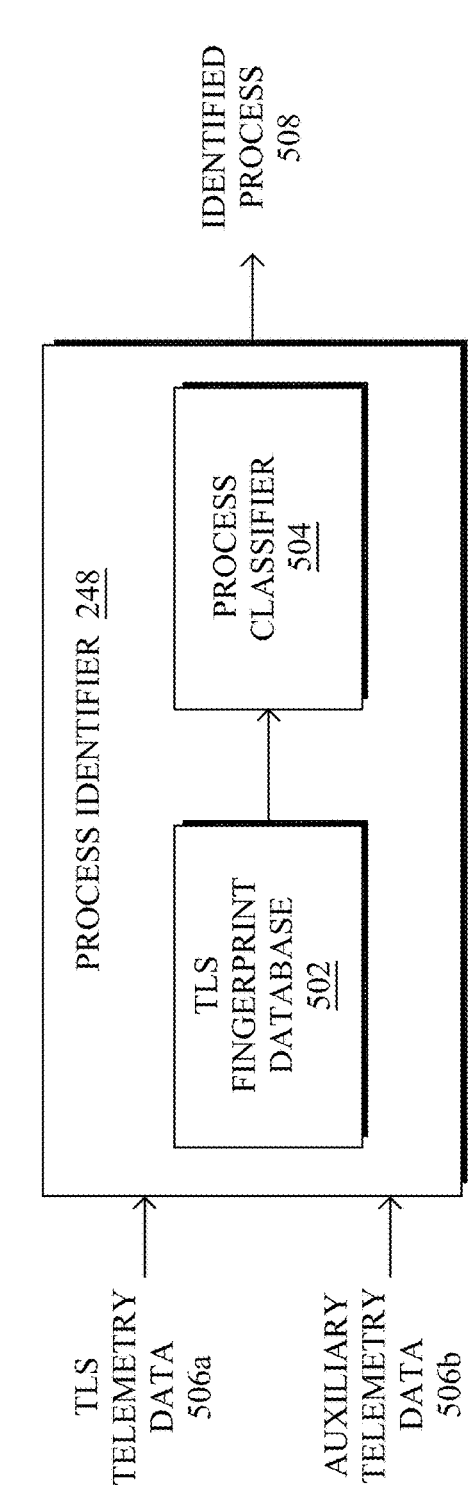
FIG. 5 illustrates an example architecture for identifying the process that initiated an encrypted traffic session in a network.

FIG. 5 illustrates an example architecture 500 for identifying the process that initiated an encrypted traffic session in a network, according to various embodiments. At the core of architecture 500 is process identifier 248 which may comprise the following components: a TLS fingerprint database 502 and a process classifier 504. These components 502-504 may be implemented in a distributed manner or implemented on a single device. In addition, some or all of components 502-504 may be implemented as part of a monitored network (e.g., at the network edge, internal to the network, etc.) or part of a cloud-based device classification service. For example, in some implementations, a cloud-based device classification service may receive telemetry data captured from a network and return an indication of the identified process back to the network. The functionalities of the components 502-504 of architecture 500 may also be combined, omitted, or implemented as part of other processes, as desired.

As shown, process identifier 248 may receive telemetry data 506a-506b from any number of devices in the network regarding an encrypted traffic session. For example, process identifier 248 may receive telemetry data 506a-506b from any number of switches, routers, firewalls, or other intermediate networking devices located between endpoints of the traffic session. In further cases, process identifier 248 may receive at least a portion of telemetry data 506a-506b directly from an endpoint of the encrypted session.

According to various embodiments, process identifier 248 may construct and maintain a TLS fingerprint database 502 based on the received telemetry data 506a-506b. In some embodiments, a fingerprint in TLS fingerprint database 502 may take the form of a string, such as an octet string, derived from observations of a single network session by extracting carefully selected substrings from that data stream in such a way that the fingerprint is identical across each session initiated by a particular process.

While TLS fingerprinting alone can help to identify the process associated with an encrypted traffic session, one observation is that two or more processes may have the same TLS fingerprint. As used herein, a 'process family' refers to a set of related processes that all have the same fingerprint. More specifically, a process family includes distinct applications that share some software in common, or that are functionally equivalent. By way of example, Firefox version 68 for Linux, Mac, and Windows may all belong to the same process family. Additionally, there can also be more than one process family associated with a single fingerprint, leading to potential classification issues when relying on TLS telemetry data 506a alone.

According to various embodiments, the techniques herein address the above challenges by augmenting the captured TLS fingerprint data in TLS telemetry data 506a for an encrypted session with auxiliary/contextual information in auxiliary telemetry data 506b regarding the destination and timing information for the session (e.g., time and/or date). For example, telemetry data 506b may include any or all of the following information:

The destination IP address of the encrypted session

The destination port of the encrypted session

The destination host/server name (e.g., from the SNI extension)

Timing information for the session, such as the day and time of the session

As shown, process identifier 248 may construct TLS fingerprint database 502 based on the obtained telemetry data 506a-506b. When implemented as part of a cloud service, TLS fingerprint database 502 may be constructed from potentially billions of observed encrypted sessions across any number of different networks. In addition to the name and hash (e.g., SHA-256) of each process, database

502 may also include a set of contextual data observed for a given process/TLS fingerprint pair:

A list of destination IP addresses (with their frequency count)

A list of destination ports (with their frequency count)

A list of server names taken from the server_name extension (with their frequency count)

Overall counts, and counts limited to recent time windows (e.g., last 30 days)

In other words, process identifier 248 may construct database 502 by obtaining telemetry data 506a-506b regarding many network sessions. Then, for each session, process identifier 248 may extract the TLS fingerprint from TLS telemetry data 506a and then incrementing the frequency count of each destination address, destination port, and/or server name indicated by auxiliary telemetry data 506b regarding the encrypted session.

More specifically, in some embodiments, the schema for TLS fingerprint database 502 may include four main sections: 1.) a set of metadata fields that provide some general information about the fingerprint, 2.) TLS features, 3.) process information, and 4.) OS information. An overview of an example schema for database 502 is as follows:

```
{
    "str_repr": "...", // Fingerprint metadata objects
    "md5_repr": "...",
    "source": ["..."], "count": z,
    "count_nvm": y,
    "count_dmz": x,
    "count_tg": w,
    "max_implementation_date": "...",
    "min_implementation_date": "...",
    "tls_features": {...}, // Human-readable description of TLS features
    "process_info": [...], // List of associated process information objects
    "os_info": [...], // List of associated OS information objects
}
```

In some embodiments, the schema of TLS fingerprint database 502 may also include information captured from a malware and/or threat intelligence service, such as ThreatGrid by Cisco Systems, Inc. For example, such information may include the process objects or OS objects used by the service, allowing for greater integration between process identifier 248 and the service.

An example of the schema for the metadata fields is as follows:

```
{
    "str_repr": "(0301)(0039003800330032003500 2f00ff)((0000)(0023))",
    "md5_repr": "89f96e9f19fd8754d9965ede7937a7b3",
    "source": ["dmz","nvm","tg"],
    "count": 691285,
    "count_nvm": 124081,
    "count_dmz": 566208,
    "count_tg": 996,
    "max_implementation_date": "2010-02",
    "min_implementation_date": "2002-06",
    ...
}
```

Similarly, an example schema for the TLS features is as follows:

```
{
    ...
    "tls_features":
    {
```

-continued

```
    "version": "TLS 1.0",
    "cipher_suites":
    [
        "TLS_DHE_RSA_WITH_AES_256_CBC_SHA",
        "TLS_DHE_DSS_WITH_AES_256_CBC_SHA",
        "TLS_DHE_RSA_WITH_AES_128_CBC_SHA",
        "TLS_DHE_DSS_WITH_AES_128_CBC_SHA",
        "TLS_RSA_WITH_AES_256_CBC_SHA",
        "TLS_RSA_WITH_AES_128_CBC_SHA",
        "TLS_EMPTY_RENEGOTIATION_INFO_SCSV"
    ],
    "extensions":
    [
        {"server_name": ""},
        {"session_ticket": ""}
    ]
    },
    ...
}
```

The process information, which may be included in telemetry data 502b, may be captured and reported by an endpoint agent executed locally by the endpoint client. For example, Network Visibility Module (NVM) by Cisco Systems, Inc., or another suitable monitoring mechanism, may capture information about the process that initiates an encrypted traffic session in the network. An example of the schema for the process information in TLS fingerprint database 502 is as follows:

```
{
    ...
    "process_info": [
    {
        "process": "Python",
        "application_category": "programming",
        "count": 82383,
        "prevalence": 0.664,
        "first_seen": "2018-05-07",
        "last_seen": "2018-05-18",
        "count_last_7_days": 0,
        "count_last_30_days": 0,
        "sha256":
"A45244F6DCF841A6C165438BB16D074487A3BB1E83
D705CBFB24690C3E09DCAE",
        "sha_db":
        {
            "filename": "Python",
            "file_version": "2.7.10",
            "product_name": "Python",
            "product_version": "2.7.10",
            "CVE_info": [ "CVE-2017-1000158",
            ...
        ]
        },
        "unique_hosts": 1,
        "hostnames":
        {
            "foo.test": 49894,
            "coincheck.com": 18016,
            ...
        },
        "dst_ips":
        {
            "203.167.51.36": 49894,
            "52.222.206.238": 7638,
            ...
        },
```

13

-continued

```
  "dst_port": {
  "443": 82383,
    }
},
...
],
...
}
```

In cases in which the endpoint client executes a monitoring agent, the process information can be further augmented with additional information. For example, below shows an example of the schema for such process information:

```
{
...
"process_info": [
    {
      "filename": "2361757781.exe",
      "sha1": "0ccaee90325287d4de4e3a73a2738bfadbe97692",
      "count": 4,
      "prevalence": 0.0046,
      "av_sigs": [
        "Riskware.Win32.Lazagne.esgdvk",
        ...
      ],
      "hostnames": {
        "www.python.org": 2,
        ... },
      "dst_ips": { "23.253.135.79": 2, ... },
      "dst_ports": { "443": 4 } }, ... ],
    ... }
```

Finally, an example of the schema for the OS information from auxiliary telemetry data 506b is as follows:

```
{
    ...
    "os_info": [
      {
        "os": "Mac OS X",
        "os_version": "10.11.6",
        "os_edition": "El Capitan",
        "count": 25202,
        "prevalence": 0.9889,
      },
      ...
    ]
}
```

According to various embodiments, process identifier 248 may also include process classifier 504 configured output an indication of an identified process 508 for a particular encrypted traffic session. For example, for a given TLS ClientHello message observed in the network, the message may be transformed into a string representation that acts as a unique key that process classifier 504 can use to query TLS fingerprint database 502. This allows process classifier 504 to retrieve the list of probable process(es) associated with the key, along with their auxiliary/contextual information. For each of these processes, process classifier 504 may calculate a normalization factor that describes the prior probability of each process given the fingerprint, i.e., the probability of a process before the target session is considered. As a simple example, the normalization factor may be of the form:

process["count_last_30_days"]/fingerprint
      ["count_last_30_days"]

The above gives more weight to processes that were observed using a specific fingerprint over the last 30 days. In this context, "last 30 days" indicates the 30-day period prior to when the session was observed. In further embodiments, process classifier 504 may use other models, to predict the probability of a process. For instance, instead of tracking the count of each process for each day, that distribution could be approximated as a Gaussian, a one-sided Gaussian, or another probability distribution.

Next, process classifier 504 may then extract session specific data, to increase the fidelity of the initial estimate. More specifically, process classifier 504 may extract three fields: destination IP address, destination port, and the server_name extension data. For each field, process classifier 504 may assign a probability to each process based on the observed session's data and the contextual data contained within the process's fingerprint entry in database 502 indicating how probable a process is given the observed data. From this, process classifier 504 may compute these values by dividing the occurrences of the process/field pair by the total count of the process.

By way of example, assume that a TLS fingerprint has been associated with both Microsoft Outlook and Firefox. Additionally, for this specific fingerprint, the contextual data indicates that Microsoft Outlook goes to "nexusrules.office-apps.live.com" in 30% of its sessions and Firefox goes to "nexusrules.officeapps.live.com" in less than 1% of its session. The per-process server_name probabilities will thus lead to process classifier 504 preferring Microsoft Outlook, in this case.

Process classifier 504 can then combine the above information, to assign a single value to each process. In turn, process classifier 504 may use these values to select the most likely process from the list of processes given by the fingerprint and output the result as identified process 508. To do so, process classifier 504 may, for each session-specific field, multiply the field by a field-specific weight, and then create a linear combination of the different fields for each process. A domain expert can assign the field-specific weights, or an optimization procedure can assign the weights based on the available data, in various embodiments. Finally, process classifier 504 may multiply the linear combination by the normalization factor and report the process with the maximum value as identified process 508. Additional data features that can also be used by process classifier 504 for this such as, for example, a Boolean value that indicates whether the destination port is different than 443 (the standard TLS port). The computation by process classifier 504 to identify the most probable process can either be done online or can be pre-computed given the input data features.

In further embodiments, rather than simply assess encrypted flows as they occur (e.g., based on their observed ClientHello messages), process classifier 504 may also take into account state information about previously seen connections, as well. Note that the contextual/auxiliary data for a process/fingerprint pair, such as destination IP address, port, and server name, is often very informative. However, this is not always the case. For example, Chrome and Firefox will visit similar sites because a user is driving the majority of the generated traffic. But, both of these processes have a non-negligible set of control traffic, or indicators, that visits servers that are very informative for process identification (e.g., *.mozilla.org).

Accordingly, process identifier 248 may also incorporate multiple sessions into its analysis, to build up an inventory of applications for a specific endpoint, and let that inventory inform future process identifications. For example, if process identifier 248 has seen many browser-related sessions from an endpoint, the smaller set of indicator flows can help to adjust the process-specific scores, so that they are more aligned with past observations. In one embodiment, process classifier 504 can also incorporate the sequential nature of network traffic by modeling the TLS traffic from an endpoint as a Markov process. If, for example, process identifier 248 observes an initial connection from Firefox to *.mozilla.org, and then observes a connection to *.google.com from the same endpoint, process classifier 504 can incorporate the probability of seeing two consecutive Firefox flows into is process identification decision, as opposed to a Firefox flow and then a googleupdate.exe flow.

More formally, process classifier 504 may take the form of a Bayesian classifier, in some embodiments. To do so, each session may be associated with a process $z \in Z$, which is not directly observed, as well as the observed data features $f_1, f_2, \ldots, f_n$. To provide a concrete example with n=4 features, let $f_1$ denote the TLS fingerprint, $f_2$ the destination address, $f_3$ the destination port, and $f_4$ the server name. The goal, then, is to make a classifier c that returns the most probable process for the feature values $(f_1, \ldots, f_n)$. To ensure that the output of the classifier is interpretable, more complex machine learning approaches may be eschewed in favor of computing the Bayesian probability estimates for each process and return that with the highest probability as follows:

$$c(f_1, \ldots, f_n) = \underset{z \in Z}{\operatorname{argmax}} \, P(z \mid f_1, \ldots, f_n) \qquad (1)$$

$$= \underset{z \in Z}{\operatorname{argmax}} \, P(f_1, \ldots, f_n \mid z) \frac{P(z)}{P(f_1, \ldots, f_n)} \qquad (2)$$

$$= \underset{z \in Z}{\operatorname{argmax}} \, P(f_1, \ldots, f_n \mid z) P(z) \qquad (3)$$

$$= \underset{z \in Z}{\operatorname{argmax}} \, P(z) \prod_{i=1,n} P(f_i \mid z) \qquad (4)$$

$$= \underset{z \in Z}{\operatorname{argmax}} \, \log P(z) \sum_{i=1,n} \log P(f_i \mid z). \qquad (5)$$

Equation (1) above simply defines the classifier c as the function that returns the most probable process for the feature list. Equation (2) applies Bayes' theorem and equation (3) removes the irrelevant denominator. Equation (4) then applies the 'naive Bayes' assumption that each observed feature is conditionally independent from all other observed features. Finally, equation (5) simplifies the computation by moving to sums of logarithms.

The naive Bayes assumption is useful because it is far easier to accurately estimate the probability $P(f_i \mid z)$ from a set of observations, as opposed to estimating P (f1, . . . , fn | z). There are several extensions to the naive Bayes approach that can improve its performance while retaining its computational simplicity, such as tree-augmented and hidden naïve Bayes that process classifier 504 can also use, in further embodiments.

To compute equation (5) above, process classifier 504 must first estimate $P(f_i \mid z)$ from the previously observed telemetry data 506. For example, suppose that the destination IP address 17.178.96.59 is observed in an encrypted session. If, in the prior observations, that address had been seen $N_a$ times for process a and $N_b$ times for process b, the estimation of P(17.178.96.59 | z=a) is straight-forward. However, there is no direct way for process classifier 504 to estimate $P(f_i \mid z)$ for any value of $f_i$ that is not in the set of prior observations. This is problematic because network data features are quite sparse. Indeed, the vast majority of Internet traffic visits only a small fraction of the addresses, server names, and ports on the Internet.

As would be appreciated, the fundamental goal of machine learning is to generalize beyond the examples in the training set and make accurate predictions about instances that are not in the set. However, it is impossible to apply interpolation to categorical variables such as addresses, ports, and names. A pair of distinct port values that are numerically close may have semantic meanings that are entirely different, for instance.

The techniques herein address the issue of data sparseness by introducing a way for process classifier 504 to determine the equivalence classes of those features using auxiliary telemetry data 506b and a way to use those equivalence classes for purposes of identifying the process associated with an encrypted session. Continuing the example above, assume that destination IP address 17.178.96.59 was observed in a session but does not appear in the prior observation set. In one embodiment, auxiliary telemetry data 506b may further include data obtained from the Domain Name System (DNS). For example, based on this, the server name apple.com may be associated with the three addresses: 17.178.96.59, 17.142.160.59, and 17.172.224.47, as well as the server names: apple.by, appleid.org, carbonapi.com, carbontest.com, dar-wincode.com, appleiphone.com, and expertapple.com.

More formally, process identifier 248 may treat the addresses 17.178.96.59, 17.142.160.59, and 17.172.224.47 are equivalent based on their DNS relationship, which can be denoted as follows:

$$\gamma_{DNS}(17.178.96.59) = \gamma_{DNS}(17.142.160.59) = \gamma_{DNS}(17.172.224.47)$$

where the function $\gamma$DNS maps an address to its equivalence class. Similarly, process identifier 248 may use a function, $\gamma$RDNS, that maps a server name to its Reverse DNS equivalence class. By way of example, all of the DNS names listed above belong to the same class.

Each equivalence relation partitions the set of features into distinct subsets. There may also be more than one useful equivalence relation for a feature, since there are multiple ways that addresses, ports, and server names can be related. All of the addresses within a BGP Autonomous System (AS) are equivalent in some way, as are the addresses in a corporate offering such as Microsoft Office365, Azure, Amazon Web Services (AWS), or Cloudflare. The companies in these cases publish the address ranges of interest. Accordingly, process identifier 248 may also leverage equivalence functions $\gamma$AS() and $\gamma$owner() for these relations, in some embodiments. In a further embodiment, another useful equivalence relation is the prevalence with which a data feature, such as the rank of webservers.

In various embodiments, the classifier of equations (1)-(5) above can also be generalized beyond prior observations by using the assumption that the probability that an observable feature has a particular value depends only on its equivalence classes. Letting $\gamma i^j$ denote the $j^{th}$ equivalence function for the $i^{th}$ feature, the assumption is that:

$$P(f_i \mid z) = \prod_{j=1,p} P(\gamma_i^j(f_i) \mid z). \qquad (6)$$

Using this assumption in equation (4) and converting to logarithms gives the generalized classifier g as follows:

$$g(f_1, \ldots, f_n) = \underset{z \in Z}{\text{argmax}}\, P(z) \prod_{i=1,n} \prod_{j=1,p_i} P\big(\gamma_i^j(f_i)\,\big|\,z\big) \qquad (7)$$

$$= \underset{z \in Z}{\text{argmax}}\, \log P(z) \sum_{i=1,n} \sum_{j=1,p_i} \log P\big(\gamma_i^j(f_i)\,\big|\,z\big), \quad (8)$$

where $p_i$ denotes the number of equivalence functions used for the $i^{th}$ feature.

Returning again to the above example, if 17.178.96.59 had not been observed in the training set for process classifier 504, but other addresses in its equivalence class had been, then the classifier c would not know how to estimate the probabilities associated with that destination, whereas g would assign probabilities based on the observations of equivalent addresses. As long as some of the addresses in each equivalence class appear in the prior data, all of the equivalence classes will be represented, and the process identifier 248 can handle sessions bound to any destination on the Internet. While there is no guarantee that all classes will be represented, the DNS, RDNS, AS, and/or owner equivalence classes all greatly expand the coverage of the empirical estimates. Note that, if needed, process identifier 248 can also apply smoothing to empirical estimates to compensate for unobserved classes.

This approach relies on the auxiliary telemetry data 506*b* used to compute DNS, RDNS, AS, and/or owner equivalence classes being accurate and timely. In practice, this data 506*b* may need to be proactively obtained, in some cases, relying either on a mechanism that pushes data 506*b* to process identifier 248 or a pull mechanism whereby process identifier 248 proactively requests this information.

Pseudocode for the computation of a generalized classifier g using equivalence classes is as follows, in one embodiment:

```
proc_list.initialize_to_empty_list( )
for z in processes do
    q ← log P(z)
    for i from 1 to n do
        for j from 1 to p_i do
            c ← γ_i^j(f_i)
            q ← q + log P(c | z)
        end for
    end for
    proc_list.append(q, z)
end for
return proc_list.get_maximum( )
```

Several optimizations on the above approach are also possible, in further embodiments. For example, the outer loop over z can be vectorized, since each operation inside that loop applies the same operations to the distinct z values. Additionally, there can be a single function for each data feature that takes that feature as input and returns all of the equivalence class values associated with that feature. Of course, the inner loops can be unrolled, too.

Computing the equivalence classes for a destination IP address involves finding all of the subnets associated with an equivalence class that match that address. Indeed, as subnets can be nested, an address can be associated with multiple subnets. The problem of finding all matching subnets is similar to the longest subnet prefix match problem. Accordingly, a natural approach would be to use a PATRICIA trie or radix trie, which can be extended to find all matching prefixes, as is needed here.

Another important optimization would be to condition the probabilities on the TLS fingerprint, and organize the computation so that it performs computation only for the processes associated with a given fingerprint, in a further embodiment. Since the number of process associated with a typical fingerprint is orders of magnitude smaller than the overall number of processes, this optimization significantly reduces computational cost. The below pseudocode illustrates this approach and also unrolls the inner loops of the above (but does not vectorize the outer loop). It makes use of the function get_process_list( ) that takes a fingerprint as input and returns the list of processes associated with it. Each of the functions get_alexa_rank( ), get_cloud_provider( ), get_asn_info( ), and get_port_category( ) takes as input a feature and returns the equivalence class for that feature. The function log_prob_fingerprint( ) returns the log of the probability of a process for the fingerprint provided as its input, and each of the functions log_prob_alexa( ) log_prob_cloud( ), log_prob_asn( ), log_prob_port_cat( ) take as input a process and an equivalence class and return the log of the probability for that pair of events.

```
proc_list.initialize_to_empty_list( )
alexa_class ← get_alexa_rank(server_name) cloud_class ←
get_cloud_provider(dest_addr) asn_class ← get_asn_info(dest_addr)
port_class ← get_port_class(dest_port)
for z in get_process_list(ÿngerprint) do
    lp ← log_prob_ÿngerprint(z, ÿngerprint)
    lp ← lp + log_prob_alexa(z, alexa_class)
    lp ← lp + log_prob_cloud(z, cloud_class)
    lp ← lp + log_prob_asn(z, asn_class)
    lp ← lp + log_prob_port_class(z, port_class)
    proc_list.append(lp, z)
end for
return proc_list.get_maximum( ))
```

Figure 6:
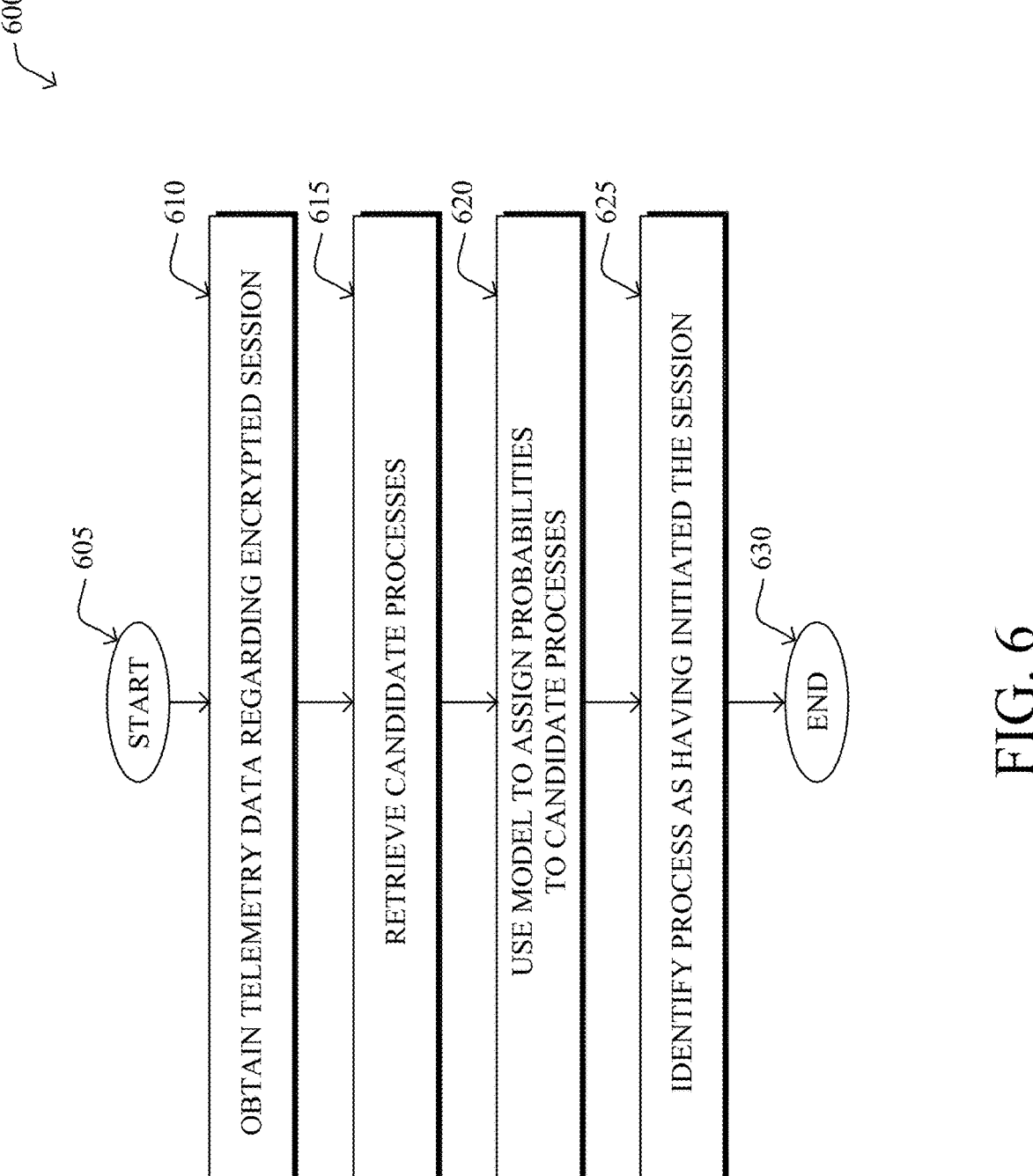
FIG. 6 illustrates an example simplified procedure for identifying a process that initiated an encrypted traffic ses- sion.

FIG. 6 illustrates an example simplified procedure for identifying a process that initiated an encrypted traffic session, in accordance with one or more embodiments described herein. For example, a non-generic, specifically configured device may perform procedure 600 by executing stored instructions, such as process identifier 248. The procedure 600 may start at step 605, and continues to step 610, where, as described in greater detail above, the device may obtain telemetry data regarding an encrypted traffic session in a network. In various embodiments, the telemetry data comprises TLS features of the traffic session and auxiliary information indicative of a destination address of the traffic session, a destination port of the traffic session, or a server name associated with the traffic session. For example, the device may receive the telemetry data from any number of intermediary networking devices between the endpoints of the encrypted traffic session. In a further case, the device may itself be an intermediary network device through which the session flows and capture the telemetry data. In various embodiments, the telemetry data may be captured without actually decrypting the encrypted traffic.

At step 615, as detailed above, the device may retrieve, using the obtained telemetry data, a plurality of candidate processes from a TLS fingerprint database that relates processes with telemetry data from encrypted traffic sessions initiated by those processes. For example, the device may transform the telemetry data into a string representation and use this representation as a lookup key for the TLS fingerprint database. In general, the fingerprint database may include entries that relate processes with the TLS and auxiliary telemetry data from their encrypted traffic sessions.

At step 620, the device may use a probabilistic model to assign probabilities to each of the plurality of candidate processes, as described in greater detail above. In various embodiments, the model make take the form of a Bayesian classifier, such as a naïve Bayesian classifier, a tree-augmented classifier, or a hidden naïve Bayesian classifier. According to further embodiments, this may also entail the device assigning at least one of the destination address, port, or server name from the auxiliary information in the obtained telemetry data to an equivalence class. For example, the equivalence class may associate addresses, ports, and/or server names that are related by belonging to the same owner (e.g., a business or other entity) or autonomous system.

At step 625, as detailed above, the device may identify one of the plurality of candidate processes as having initiated the encrypted traffic session based on its assigned probability. Notably, the device may determine that the process with the highest assigned probability is the process that initiated the encrypted traffic session. This information is quite useful and can be used, for example, to determine that the identified process comprises malware or represents a security threat, such as a version of software with a known vulnerability. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Multi-Protocol/Multi-Session Process Identification

Figure 7:
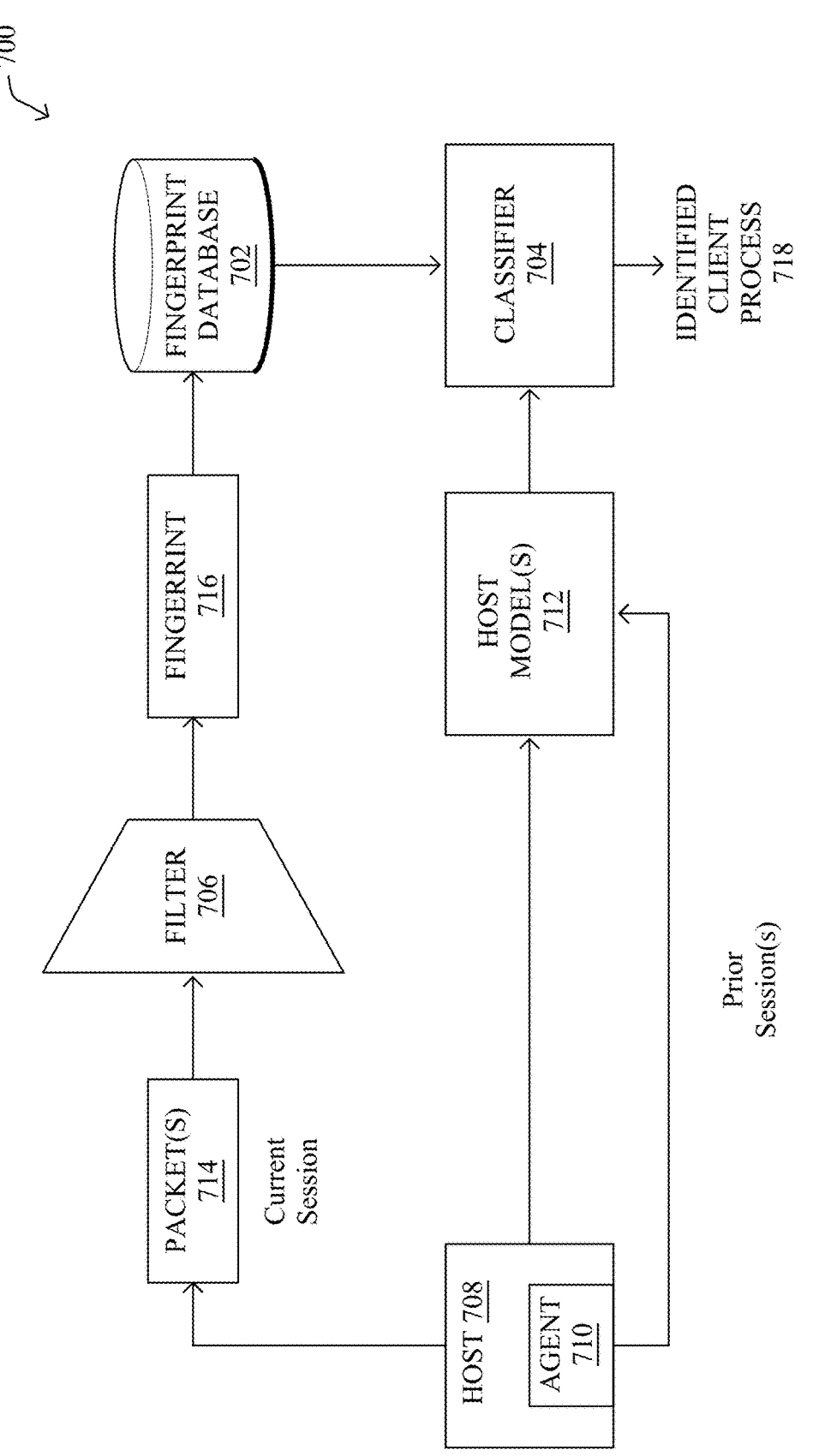
FIG. 7 illustrates an example architecture for multi- protocol/multi-session process identification.

In alternate embodiments, process identifier 248 may be implemented so as to identify a process as initiating an encrypted traffic session across a plurality of protocols (i.e., multi-protocol) and a plurality of sessions (i.e., multi-session). In particular, while the techniques herein above have been described primarily with reference TLS, FIG. 7 shows an example architecture 700 that illustrates process identification across multiple protocols. Notably, architecture 700 may be implemented to identify processes in a network, for example, with traffic sessions according to QUIC protocol, Secure Shell (SSH), Datagram Transport Layer Security (DTLS,) HTTP and the like.

Architecture 700, as shown, may comprise fingerprint database 702 and classifier 704, which each may perform substantially the same functions as, respectively, TLS fingerprint database 502 and process classifier 504, as described herein above. Of note, however, fingerprint database 702 may include fingerprints that are associated with packets from a plurality of communications protocols, which may be encrypted or unencrypted. Architecture 700 may further comprise filter 706, host device 708, an agent 710 that is installed on host device 708 and one or more host models 712.

Host device 708 as described in greater detail herein may be any device that is configured to communicate and/or use processes as described in greater detail herein above. Notably, host device 708 may be configured to communicate with a particular process using one or more packets 714 that are determined according to a particular communication protocol, for example, QUIC. As is understood in the art, such communication protocol may be encrypted or unencrypted. One or more packets 714 may be sent by host device 708 through a filter 706, for example, a packet filter (i.e., a firewall) that can be configured select a packet from the one or more packets 714. The selected packet may then have a flexible fingerprint definition, as described in greater detail herein above applied it, where the flexible fingerprint definition may be used to extract (i.e., determine) a fingerprint 716 for the packet. Fingerprint 716 may be, for example, in the form of a string.

Fingerprint 716 may then be used to query fingerprint database 702, where fingerprint database 702 maintains one or more database entries that lists all processes and their destinations (e.g., addresses) that have been previously observed using fingerprint 716. It is contemplated that the processes may have been determined and/or associated with a particular fingerprint across protocols. Classifier 704, which can be one or more machine learning-based techniques, may then be applied to processes (and/or destinations) associated with fingerprint 716 in the database, where classifier 704 is configured to identify a most probable client process 718 that is associated with one or more packets 714.

In some embodiments, classifier 704 may be configured to estimates a probability of each process from the fingerprint and a corresponding destination context, then chooses most probable client process 718 with a largest probability. Additionally, classifier 704 may be configured to determine an equivalence class of a DNS name, IP address, or port number, based on a list of the equivalence classes of those data features. In such cases, classifier 704 may be configured to determine to identify most probable client process 718 based at least in part due to the equivalence classes of those features.

It is to be understood that classifier 704 may be enhanced using one or more host models 712 that are configured to track previous sessions as well as corresponding processes by host device 708. Such tracking may be performed by agent 710 that is installed on host device 708. Further, agent 710 may be configured to augment the host device 708 with a ground truth (that is obtained by agent 710). Alternatively, one or more host models 712 may be selected from other host devices that share characteristics with host device 708, for example, a model type, geographic location, etc.

Figure 8:
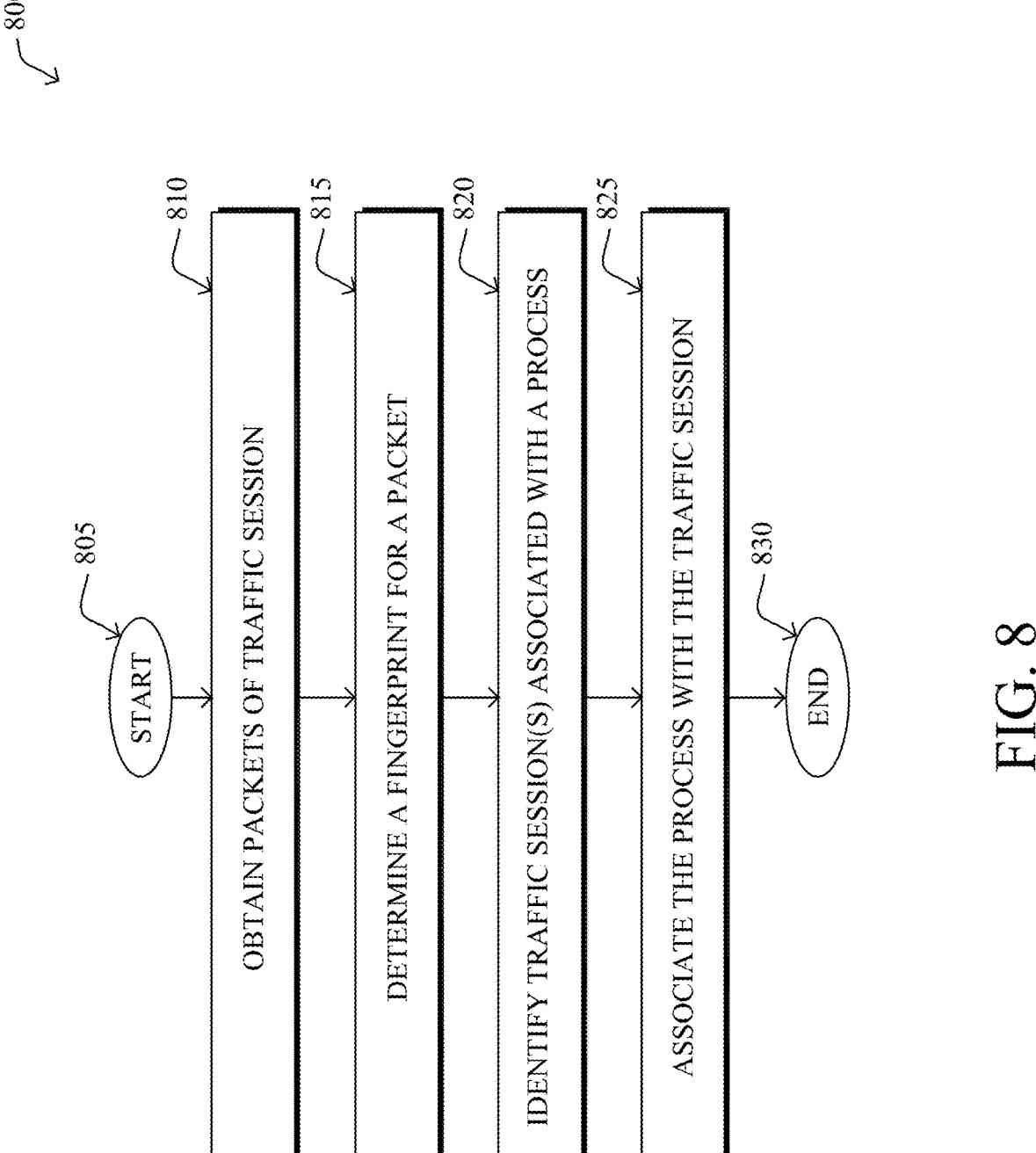
FIG. 8 illustrates an example simplified procedure multi- protocol/multi-session process identification.

FIG. 8 illustrates an example simplified procedure for multi-protocol/multi-session process identification in accordance with one or more embodiments described herein. For example, a non-generic, specifically configured device may perform procedure 800 by executing stored instructions, such as process identifier 248. The procedure 800 may start at step 805, and continues to step 810, where, as described in greater detail above, a device may obtain one or more packets of a traffic session in a network. In an embodiment, and as described above herein in greater detail, the one or more packets may comprise QUIC packets, Datagram Transport Layer Security packets, or SSH packets.

At step 815, as detailed above, the device may determine, for a particular packet of the one or more packets that match a filter, a fingerprint for the particular packet. For example, as described herein above, the one or more packets may be filtered using a variety of protocols.

At step 820, the device may identify a plurality of traffic sessions whose packets match the fingerprint, wherein each of the plurality of traffic sessions is associated with at least one process. In an embodiment, the plurality of traffic sessions may be according to a plurality of different communications protocols. That is, the previously obtained and stored (e.g., in a fingerprint database) traffic sessions may have been communicated using differing communication protocols but still associated with a same fingerprint. In another embodiment, wherein the plurality of traffic sessions may be according to a single communication protocol.

At step 825, as detailed above, the device may associate a process with the traffic session by applying a classifier to the plurality of traffic sessions. In one embodiment, the device may enhance the classifier with a host model. Notably, the host model may be associated with a host device of the network that sent the one or more packets. The host model may be modeled based on previous traffic sessions of a host device. Further, in an embodiment, the device may determine that the process associated with the traffic session comprises malware or represents a security threat. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. The techniques described herein, therefore, allow for the identification of a process that initiated an encrypted traffic session in a network. In some aspects, leveraging auxiliary information, such as the destination address, port, or server name associated with the session can aid in better matching the session to a process (e.g., an application or other software component). In some embodiments, for the HTTP protocol, the User Agent field in an HTTP request can be used to better identify the process associated with an HTTP session.

While there have been shown and described illustrative embodiments that provide for the identification of a process that initiated an encrypted traffic session, it is to be understood that various other adaptations and modifications may be made within the spirit and scope of the embodiments herein. For example, while certain embodiments are described herein with respect to using certain models for purposes of this identification, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, at a device, one or more packets of an encrypted QUIC traffic session in a network;
   determining, by the device, a plurality of application-specific flows multiplexed within the encrypted QUIC traffic session using a flexible fingerprint definition applied to extract a fingerprint for a particular packet that matches a filter;

querying, by the device, a fingerprint database that maintains database entries listing processes and their destinations that have been previously observed using the fingerprint across multiple protocols;
   associating a plurality of packets within the encrypted QUIC traffic session with a first application-specific flow of the plurality of application-specific flows by applying a machine learning classifier to one or more packets from the encrypted QUIC traffic session, wherein the machine learning classifier is configured to identify a most probable client process that initiated the encrypted QUIC traffic session based on the fingerprint and destination context information; and
   determining, by the device, that the most probable client process comprises one of malware or a security vulnerability requiring updating or removal from an endpoint.

2. The method of claim 1, wherein the machine learning classifier comprises one or more of: k-nearest neighbors (k-NN), statistical techniques, neural networks, and Markov models.

3. The method of claim 1, wherein associating the plurality of packets comprises determining that the first application-specific flow corresponds to one of a video streaming flow, a web browsing flow, or a malicious flow.

4. The method of claim 1, wherein the machine learning classifier analyzes one or more of: sequence of packet lengths and time (SPLT) data, sequence of application lengths and time (SALT) data, or byte distribution (BD) data.

5. The method as in claim 1, further comprising:
   enhancing, by the device, the classifier with a host model.

6. The method as in claim 5, wherein the host model is associated with a host device of the network that sent the one or more packets.

7. A system comprising:
   one or more computers each including a processor and a memory, wherein the one or more computers are operable to execute instructions which cause the system to perform operations including:
   obtaining, at a device, one or more packets of an encrypted QUIC traffic session in a network;
   determining, by the device, a plurality of application-specific flows multiplexed within the encrypted QUIC traffic session using a flexible fingerprint definition applied to extract a fingerprint for a particular packet that matches a filter;
   querying, by the device, a fingerprint database that maintains database entries listing processes and their destinations that have been previously observed using the fingerprint across multiple protocols;
   associating a plurality of packets within the encrypted QUIC traffic session with a first application-specific flow of the plurality of application-specific flows by applying a machine learning classifier to one or more packets from the encrypted QUIC traffic session, wherein the machine learning classifier is configured to identify a most probable client process that initiated the encrypted QUIC traffic session based on the fingerprint and destination context information; and
   determining, by the device, that the most probable client process comprises one of malware or a security vulnerability requiring updating or removal from an endpoint.

8. The system of claim 7, wherein the machine learning classifier comprises one or more of: k-nearest neighbors (k-NN), decision trees, convolutional neural networks (CNN), recurrent neural networks (RNN), and long short-term memory (LSTM) networks.

9. The system of claim 7, wherein associating the plurality of packets comprises determining that the first application-specific flow corresponds to one of a video streaming flow, a web browsing flow, or malware flow.

10. The system of claim 7, wherein the machine learning classifier analyzes one or more of: sequence of packet lengths and time (SPLT) data, sequence of application lengths and time (SALT) data, or byte distribution (BD) data.

11. The system of claim 7, further comprising: enhancing, by the device, the classifier with a host model.

12. The system of claim 11, wherein the host model is associated with a host device of the network that sent the one or more packets.

13. A non-transitory computer-readable medium including instructions, which when executed on one or more computers each including a processor and a memory, cause the computers to perform operations including:

obtaining, at a device, one or more packets of an encrypted QUIC traffic session in a network;

determining, by the device, a plurality of application-specific flows multiplexed within the encrypted QUIC traffic session using a flexible fingerprint definition applied to extract a fingerprint for a particular packet that matches a filter;

querying, by the device, a fingerprint database that maintains database entries listing processes and their destinations that have been previously observed using the fingerprint across multiple protocols;

associating a plurality of packets within the encrypted QUIC traffic session with a first application-specific flow of the plurality of application-specific flows by applying a machine learning classifier to one or more packets from the encrypted QUIC traffic session, wherein the machine learning classifier is configured to identify a most probable client process that initiated the encrypted QUIC traffic session based on the fingerprint and destination context information; and determining, by the device, that the most probable client process comprises one of malware or a security vulnerability requiring updating or removal from an endpoint.

14. The non-transitory computer-readable medium of claim 13, wherein the machine learning classifier comprises one or more of: k-nearest neighbors (k-NN), decision trees, convolutional neural networks (CNN), recurrent neural networks (RNN), and long short-term memory (LSTM) networks.

15. The non-transitory computer-readable medium of claim 13, wherein associating the plurality of packets comprises determining that the first application-specific flow corresponds to one of a video streaming flow, a web browsing flow, or malware flow.

16. The non-transitory computer-readable medium of claim 13, wherein the machine learning classifier analyzes one or more of: sequence of packet lengths and time (SPLT) data, sequence of application lengths and time (SALT) data, or byte distribution (BD) data.

17. The non-transitory computer-readable medium of claim 13, further comprising: enhancing, by the device, the classifier with a host model.

18. The non-transitory computer-readable medium of claim 17, wherein the host model is associated with a host device of the network that sent the one or more packets.

* * * * *